United States Patent
Lin et al.

(10) Patent No.: US 6,952,129 B2
(45) Date of Patent: Oct. 4, 2005

(54) FOUR-PHASE DUAL PUMPING CIRCUIT

(75) Inventors: Hong-chin Lin, Taipei (TW);
Ming-Chih Hsieh, Taipei (TW);
Jain-Hao Lu, Taipei (TW);
Chien-Hung Ho, Hsin-Chu (TW)

(73) Assignee: eMemory Technology Inc., Hsin-Chu (TW)

( * ) Notice: Subject to any disclaimer, the term of this patent is extended or adjusted under 35 U.S.C. 154(b) by 9 days.

(21) Appl. No.: 10/707,786

(22) Filed: Jan. 12, 2004

(65) Prior Publication Data

US 2005/0151580 A1      Jul. 14, 2005

(51) Int. Cl.[7] ................................. G05F 3/02
(52) U.S. Cl. .................. 327/536; 327/537; 363/60
(58) Field of Search ........................ 327/534, 536, 327/537; 363/59, 60

(56) References Cited

U.S. PATENT DOCUMENTS

| | | | | |
|---|---|---|---|---|
| 5,422,590 A | * | 6/1995 | Coffman et al. | ............ 327/537 |
| 5,644,534 A | * | 7/1997 | Soejima | ................. 365/185.23 |
| 5,982,223 A | * | 11/1999 | Park et al. | .................... 327/536 |
| 6,130,574 A | * | 10/2000 | Bloch et al. | ................ 327/536 |
| 6,359,501 B2 | * | 3/2002 | Lin et al. | .................... 327/536 |
| 6,369,642 B1 | * | 4/2002 | Zeng | .......................... 327/536 |
| 6,452,438 B1 | * | 9/2002 | Li | ............................... 327/536 |
| 6,642,773 B2 | * | 11/2003 | Lin et al. | .................... 327/536 |
| 6,677,806 B2 | * | 1/2004 | Bloch | ......................... 327/536 |

* cited by examiner

*Primary Examiner*—Terry D. Cunningham
(74) *Attorney, Agent, or Firm*—Winston Hsu

(57) ABSTRACT

A four-phase dual pumping circuit has a number of stages according to the required output voltage based on an input voltage. Each stage has a first pumping unit and a second pumping unit that are mirror and identical to each other and electrically coupled to each other. The dual pumping circuit is controlled by four-phase clocks which are made from one pair of out of phase clocks. The transistors of the dual pumping circuit have special substrate connection to minimize body effects. The four-phase dual pumping circuit uses NMOSFETS for negative pumping and PMOSFETS for positive pumping.

16 Claims, 21 Drawing Sheets

NMOS transistor

P-sub

PMOS transistor

FOUR-PHASE DUAL PUMPING CIRCUIT

BACKGROUND OF INVENTION

1. Field of the Invention

The invention generally relates to charge pumps, and more particularly, to methods and apparatus for generating a high positive or a negative voltage for memory devices.

2. Description of the Prior Art

The era of digital information has arrived which pushed the development of electronic information processing devices such as computers, wireless devices, personal digital assistants (PDAs), portable multimedia players/recorders, and the like in the recent years. One crucial component to any electronic information processing device is the memory device which has gone under substantial advancement. The performance in speed and reliability along with the size and packaging of these memory devices have greatly improved as a result smaller and faster memory devices are continuously being introduced to the market.

In order to reduce power consumption and extend battery life, much of the integrated circuitry such as memory devices used in portable devices is being designed to run at low voltage levels. This reduces the power usage and reduces the heat generated by the circuit components allowing more components to be placed closer to one another. The circuitry and components used in portable computers typically are being designed to operate at voltages levels substantially less than the previous standard of 5V, with 1.0V and lower becoming increasingly common.

A major problem is that conventional charge pumps have difficulty dealing with the lower battery voltages being used. In particular, the MOS transistors used in the charge pumps have switching threshold voltages that are a large fraction of the supply voltage. The problem is related to the fact that diode-connected transistors develop increasing back-bias between the source and the body of the transistor as the voltage increases along the length of the pump. The result of this back-bias (also known as the "source-body effect", "M factor", or "body effect") is to increase the effective threshold of the transistor, in some higher voltage cases almost doubling it. With increased effective transistor thresholds and decreased supply voltages, the charge pump transistors would no longer switch properly and the charge pump would not work.

Many designs used a technique called "bootstrapping" to generate higher amplitude clock signals to compensate for the increased effective threshold voltages relative to the supply voltage. The bootstrapping technique involves the use of a charge capacitor that charges on every clock pulse and discharges between pulses, adding the discharged voltage to the original input voltage of the bootstrapping circuit so the output could be multiplied to a number of times the original input. Applying a uniform high clock voltage, generated by bootstrapping, leads to energy inefficiency because the greater the current delivered by the clocking voltage, the less efficient the bootstrapping operation. In the latter stages where high voltages are required, this inefficiency was unavoidable. In the initial stages of the charge pump, where as high a voltage is not needed, the clock bootstrapping operation was inefficient.

In general, currently available charge pumps are inefficient, large, and complex. They do not properly deal with low initial supply voltages and fail to address the problems inherent with higher threshold voltages caused by the body effect. A solution, which would provide a simple charge pump with efficient operation using a low initial supply voltage, has long been sought but has eluded those skilled in the art. As the popularity grows of portable battery-powered devices in which such a design could be particularly useful, it is becoming more pressing that a solution be found.

Different approaches to designing charge pumps were previously disclosed. "Charge pump circuit having a boosted output signal" U.S. Pat. No. 4,935,644 by J. Tsujimoto shown in FIGS. 1 and 2 discloses a charge pump circuit having a first charge pump circuit and a second charge pump circuit that is controlled by two phase clocks. The first and the second charge pump circuits comprise a series of serially diode-connected MOSFETs where the gates of the transistors in the second charge pump are connected to the corresponding stage transistors in the first charge pump. The final output of the first charge pump circuit is connected to a high resistance element so there is no external loss and the second charge pump circuit can achieve an adequate boost-up voltage where there is a greater external current loss. Tsujimotos charge pump circuit uses two identical but out-of-phase clocks and no substrate connection. "Method and apparatus for a two phase bootstrap charge pump" U.S. Pat. No. 5,462,469 by Tedrow shown in FIGS. 3 and 4 discloses a two phase bootstrap charge pump that uses four complicated and non-identical clock signals to pre-charge the gates and transfer charge to the next stage. Tedrows two phase bootstrap charge pump does not have any substrate connection to remove body effects and uses NMOS for positive pump.

SUMMARY OF INVENTION

It is therefore a primary objective of the claimed invention to provide four-phase dual pumping circuits that provide a high positive voltage that is above the supply voltage and at the same time a high negative voltage that is lower than the ground voltage which are required for write and erase operations in memory devices to solve the abovementioned problem.

It is another objective of the claimed invention to provide four-phase dual pumping circuits that efficiently generates the required high positive and high negative voltages using the same triple-well technology at a low supply voltage.

It is another objective of the claimed invention to provide a four-phase dual pumping circuit that minimizes the body effect of the main pass transistors so the output voltage is maximized.

It is another objective of the claimed invention to provide a four-phase dual pumping circuit that avoids p-n junction conduction.

According to the claimed invention, a four-phase dual pumping circuit is provided that can both operate as either a negative or positive dual pumping circuit. The negative dual pumping circuit uses NMOS transistors and the positive dual pumping circuit uses PMOS transistors. The dual pumping circuit of the present invention has a number of stages according to the required output voltage based on an input voltage. Each stage has a first pumping unit and a second pumping unit that are mirror and identical to each other and electrically coupled to each other, where each stage is electrically coupled to the preceding and subsequent stages. The first pumping unit and the second pumping unit of each stage generate outputs Vout1 and Vout2 respectively which are used as inputs for the subsequent stages for pumping the input voltage to a required output voltage. The first pumping unit and the second pumping unit of each stage has a main pass transistor, a boosting transistor, and a substrate transistor, where the main pass transistor is used to transfer charge to the subsequent stage, the boosting transistor is used to pre-charge the current stage, and the substrate transistor is used to supply a high voltage to the body of the control and boosting transistors during charge transfer to reduce body effects, wherein the main pass transistor, boosting transistor, and substrate transistor have a source, drain, gate, and body terminal. The substrate transistor of either pump circuit is controlled by a high voltage signal sent from the other pump circuit. As a result the first pumping unit and the second pumping unit of each stage alternately perform the pre-charge and charge transfer operation. The operation of the dual pumping circuit of the present invention is controlled by four sets of clock pulses in which one pair of clock pulses is out of phase and one pair of clock pulses may be generated by a high voltage circuit. One clock pulse from each pair (i.e. together two) is used to control each pumping circuit of the dual pumping circuit in an alternating manner. The output of the final stage is cross-coupled to maximize the output voltage. Additionally the input voltage of the final stage can be cross-coupled to increase the amplitude of the input voltage.

According to the claimed invention, a method for the first stage of the dual pumping circuit is provided which includes supplying an input voltage to the source terminals of the main pass transistors of the first pumping unit and the second pumping unit; during interval one to three, the first pumping unit performs charge sharing while the second pumping unit performs pre-charge; in interval one, rendering the main pass transistors of the first pumping unit and the second pumping unit, the substrate transistor of the second pumping unit, and the boosting transistor of the first pumping unit off, and the substrate transistor of the first pumping unit and the boosting transistor of the first pumping unit on; following in interval two, rendering the main pass transistor of the first pumping unit, the substrate transistor of the first pumping unit, and the boosting transistor of the second pumping unit on, and the boosting transistor of the first pumping unit, the substrate transistor of the second pumping unit, and the main pass transistor of the second pumping unit off; and continuing in interval three, rendering the main pass transistor of the first pumping unit, the boosting transistor of the first pumping unit, the substrate transistor of the second pumping unit, and the main pass transistor of the second pumping unit off, the boosting transistor of the second pumping unit, and the substrate transistor of the first pumping unit on.

During intervals four to six, the second pumping unit performs charge sharing while the first pumping unit performs pre-charge; in interval four, rendering the substrate transistor of first pumping unit, the main pass transistor of the first pumping unit, the main pass transistor of the second pumping unit, the boosting transistor of the second pumping unit off, and the boosting transistor of the first pumping unit, and the substrate transistor of the second pumping unit on; following in interval five, rendering the main pass transistor of the second pumping unit, the substrate transistor of the second pumping unit, and the boosting transistor of the first pumping unit on, and the substrate transistor of the first pumping unit, the main pass transistor of the first pumping unit, and the boosting transistor of the second pumping unit off; and continuing in interval six, rendering the main pass transistor of the second pumping unit, the substrate transistor of the first pumping unit, the main pass transistor of the first pumping unit, and the boosting transistor of the second pumping unit off, and the substrate transistor of the second pumping unit and the boosting transistor of the first pumping unit on.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
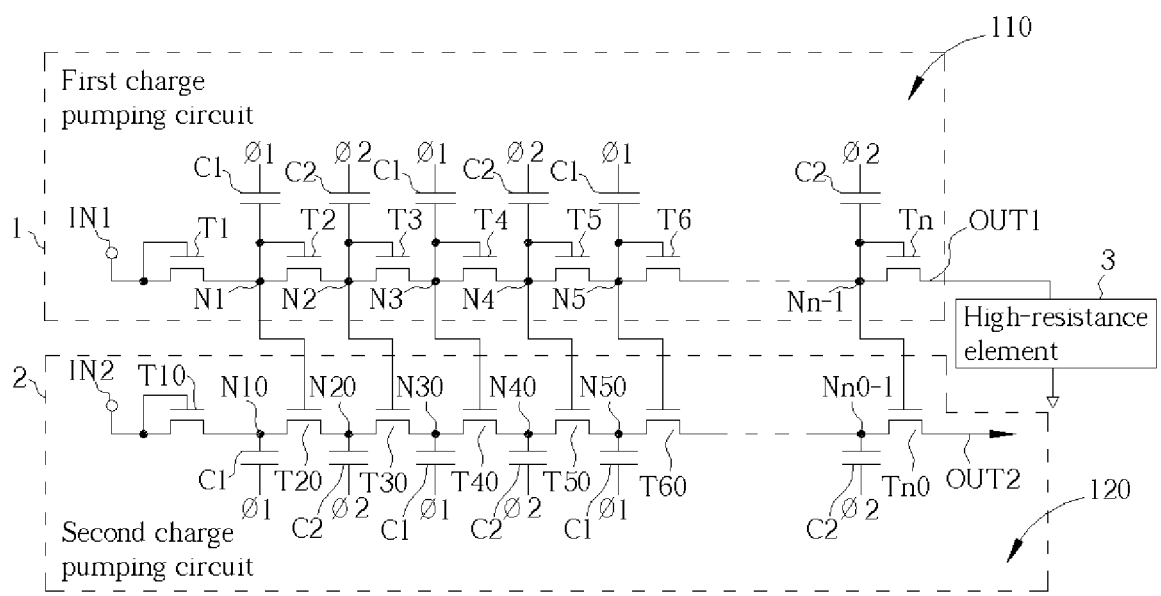
FIG. 1 is a diagram of a charge pump circuit according to prior art.
Figure 2:
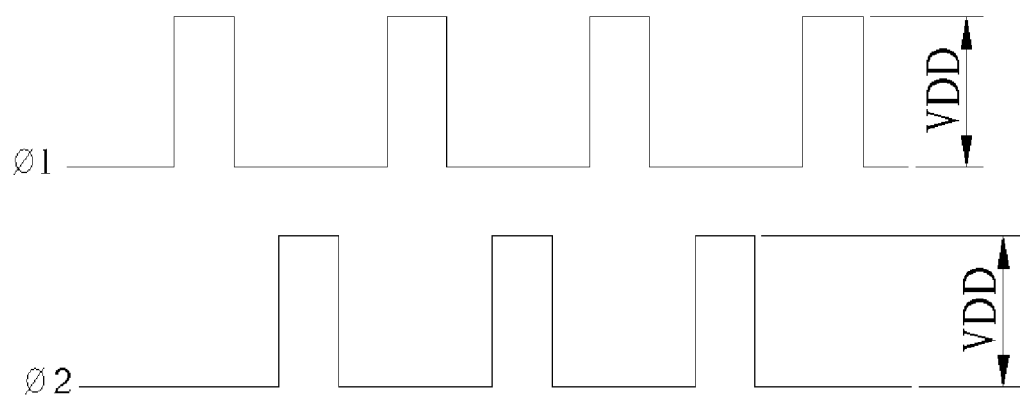
FIG. 2 is a diagram of clock signals for the charge pump circuit in FIG. 1 according to prior art.
Figure 3:
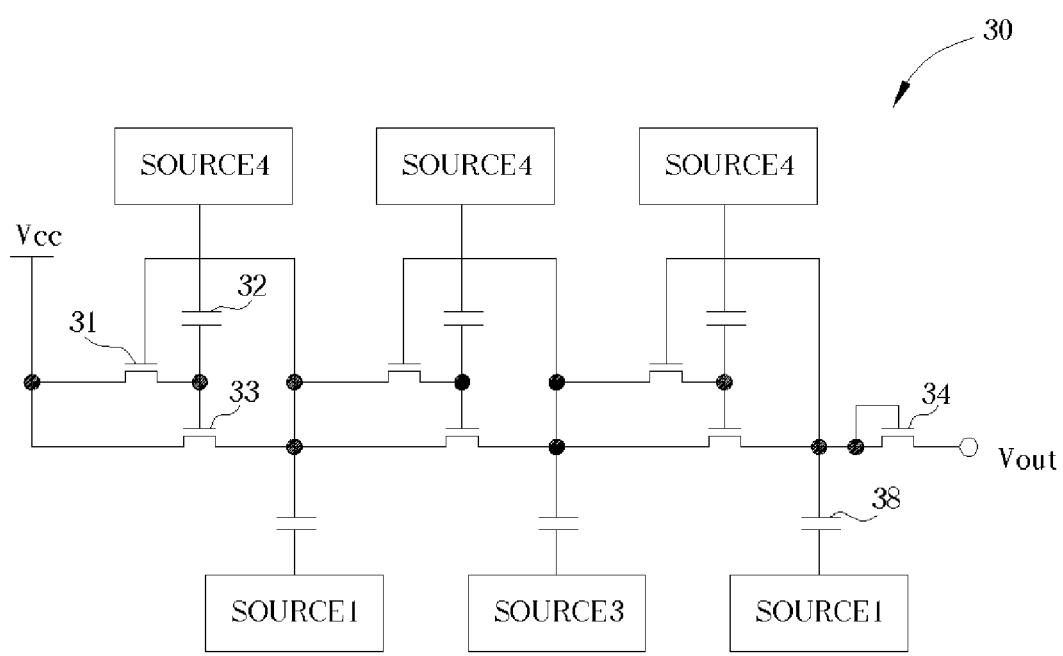
FIG. 3 is a diagram of a two phase bootstrap charge pump according to prior art.
Figure 4:
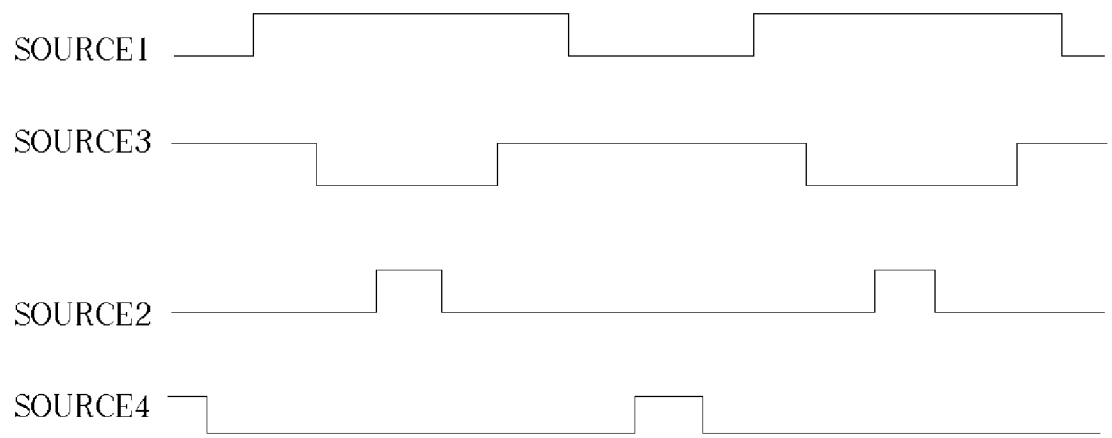
FIG. 4 is a diagram of clock signals for the two phase bootstrap charge pump in FIG. 3 according to prior art.
Figure 5:
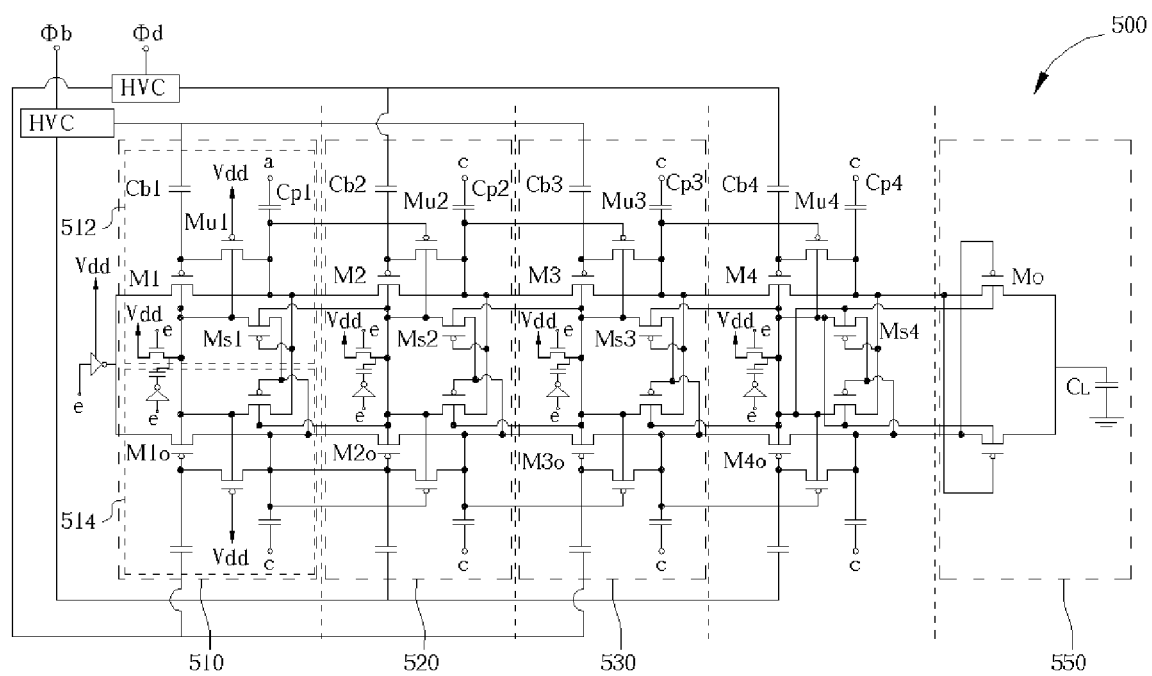
FIG. 5 is a schematic circuit layout for the positive dual pumping circuit according to one embodiment of the present invention.

Please refer to FIG. 5 which shows the circuit design of the dual pumping circuit according to one embodiment of the present invention. The dual pumping circuit is suitable for many different electrical devices and the focus of the embodiments will be on memory devices which are well known to those skilled in the art. Positive dual pumping circuit 500 comprising a plurality of PMOS, shown in FIG. 5, is illustrated with 4 stages, wherein each stage is further described in details in FIGS. 8–13 where the operation of each stage is described. The dual pumping circuit 500 shown in this embodiment is exemplified by a four-phase four-stage positive charge dual pumping circuit but the number of phases and stages is not limited to what is disclosed by the present invention and can be altered according to the spirit of the present invention.

The dual pumping circuit 500 comprises four serially linked stages 510, 520, 530, and 540 for achieving the required output voltage Vout from a low supply voltage Vdd. The positive dual pumping circuit 500 uses PMOS transistors based on triple-well with p-substrate technology which differs slightly that the negative dual pumping circuit 1500 that uses NMOS transistors. The stages 510, 520, 530, and 540 are all identical and each stage is comprised of a mirror structure further comprising an identical pair of a first pumping unit 512 and a second pumping unit 514. The first pumping unit 512 and the second pumping unit 514 of each stage are respectively electrically coupled to the first pumping unit and the second pumping unit of the preceding and subsequent stages with the exception that the first stage 510 of the dual pumping circuit is electrically coupled to an input voltage Vdd which is further electrically coupled to an inverter and the last stage 540 of the dual pumping circuit is electrically coupled to an output stage 550. The output Vout of the dual pumping circuit is electrically coupled to an output capacitor CL and is cross-coupled so that the charge can be transferred to the output more efficiently.

Figure 14:
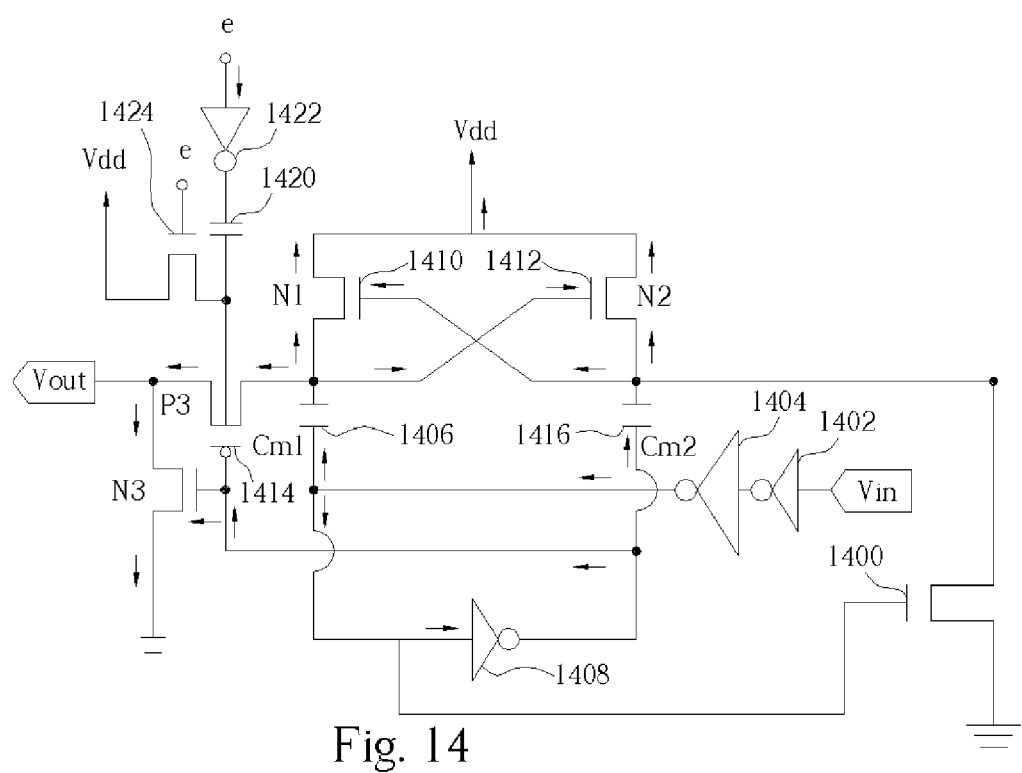
FIG. 14 is a schematic diagram of the high voltage circuit of the dual pumping circuit of the present invention.

Four set of clock pulses labeled Fa, Fb, Fc, and Fd control the operation of the dual pumping circuit 500 wherein Fa and Fc are regular clock pulses and Fb and Fd may be high voltage clock pulses generated by a high voltage circuit (HVC) which is further described in FIG. 14. The four sets of clock pulses work simultaneously to control both the first pumping unit 512 and the second pumping unit 514 of each stage.

Figure 6:
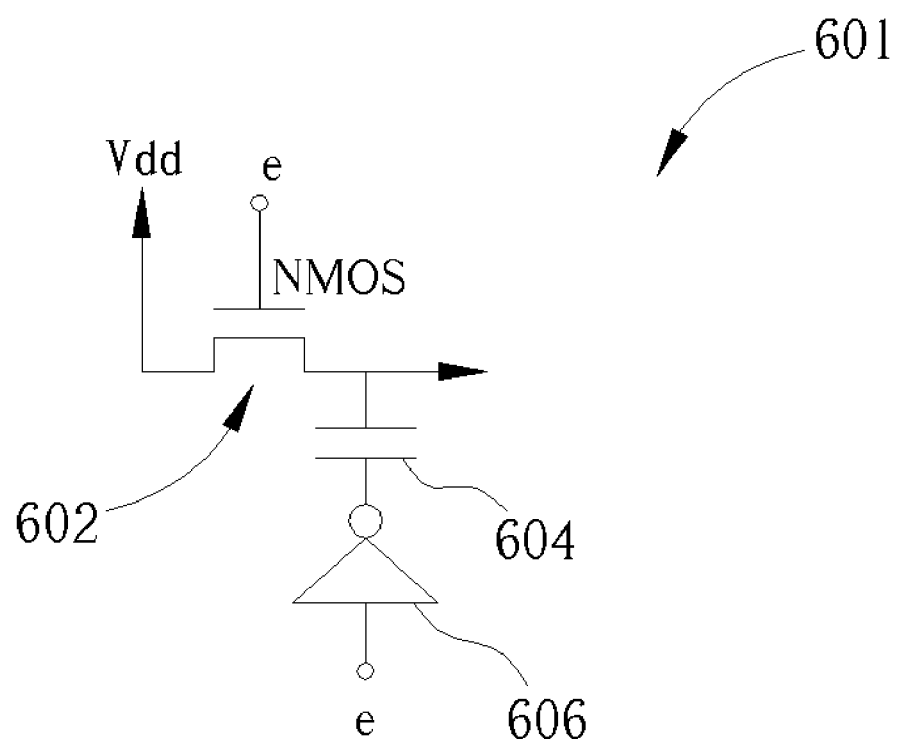
FIG. 6 is a magnified view of the schematic circuit layout for the positive dual pumping circuit according to one embodiment of the present invention.

Please continue to refer to FIG. 6 which shows another embodiment of the present invention with the addition of an extra voltage controller 601 comprising a NMOS transistor 602, a capacitor 604, and an inverter 606. The NMOS transistor 602 is controlled by an additional set of control clock pulses Fe. The additional control clock pulse Fe is set to high before the operation of the dual pumping operation and is then set to low during the operation of each stage of the dual pumping operation to prevent any P-N junction forward conduction. The NMOS transistor 602 is electrically coupled to a common node which is further electrically coupled to the capacitor 604 and the inverter 606 that are also controlled by the clock pulse Fe. The voltage controller 601 is separately electrically coupled to all stages 510, 520, 530, and 540 to ensure appropriate bias conditions at the initial pumping operation. Since the voltage controller 601 of each stage 510, 520, 530, and 540, are the same, the first voltage controller 601 of the first stage 510 is chosen to represent the rest of the duplicated stages. The voltage controller 601 is electrically coupled to the body of the main pass transistor of the first pumping unit 512 and the second pumping unit 514 to eliminate any body effect because the voltage difference of the source/drain and the body is close to zero. After the input voltage Vdd controlled by clock pulse φe is inputted to the first stage 510 of the dual pumping circuit 500, the transistor M1 of the first pumping unit 512 and M1o of the second pumping unit 514 (either transistor M1 or M1o being the first to transfer charge depending on the design of the clock pulses) is ready to transfer the pre-charge across to the subsequent stage 520. At the instance when the charge is transferred, the clock pulse φe is set to low and the body of the main pass transistor M1 is at Vdd which minimizes body effects because the voltage difference of the source/drain and the body is approximately zero. For the subsequent stages, the output from every stage is commonly electrically coupled to the voltage controller of the subsequent stages so the partially pumped output voltage from each stage is used as the voltage to control the main pass transistors of the subsequent stages so the voltage difference of the source/drain and the body of all the subsequent stages is close to zero.

Figure 7:
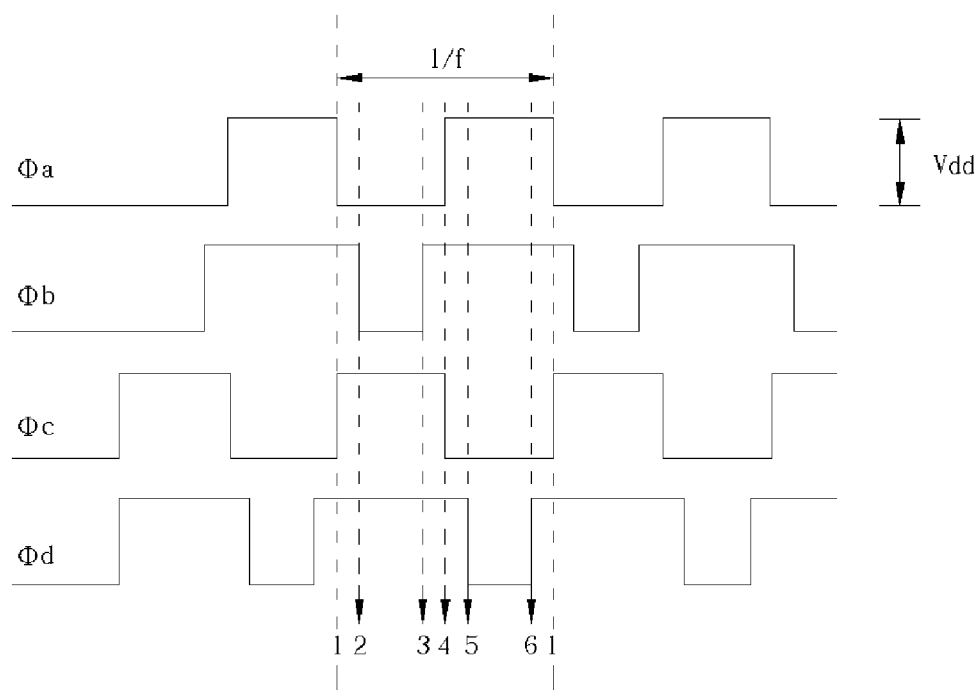
FIG. 7 is a diagram showing the clock pulses for controlling the operation of the positive dual pumping circuit in FIG. 5.

Please refer to FIG. 7 which shows the sets of clock pulses φa, φb, φc, andφd used to control the PMOS transistors of each stage of the dual pumping circuit in FIG. 5 of the present invention. It can be clearly identified from the diagram that the clock pulses Fa and φc are out-of-phase clock pulses and clock pulsesφb and φd follow clock pulses Fa and φc respectively by a narrower low voltage period. The identical but out-of-phase clock pulses only require a clock generator (not shown) which reduces the cost and difficulty of design. Clock pulse φb follows clock pulse φa and clock pulse φd follows clock pulse φc. The detailed cumulative operation of all the clock pulses Fa, φb, φc, andφd is further explained in FIGS. 8–13 in conjunction with the PMOS transistors of the dual pumping circuit of the present invention. The operation of the first stage (for example) starts when the first falling edge of the clock pulseφa occurs that triggers the following precharge and charge transfer operations. The two consecutive falling edges between the clock pulseφa represents one period which is 1/f. Within one period, there are six intervals which are numbered 1 to 6 which are used to sequentially describe the operation of the positive dual pumping circuit FIGS. 8–13 at each interval.

Please sequentially refer to FIGS. 8–13 which show the operation of one exemplary stage of the dual pumping circuit of the present invention. In FIGS. 8–13, each stage of the dual pumping circuit comprises a first pumping unit 802 and a second pumping unit 804 which are identical to each other and mirrored along an imaginary line i (shown only for explanation). The first pumping unit 802 comprises a first main pass PMOS transistor 812, a first boosting PMOS transistor 814, a first substrate PMOS transistor 816, a first small capacitor 818, and a first large capacitor 820. Similarly the second pumping unit comprises a second main pass PMOS transistor 822, a second boosting PMOS transistor 824, a second substrate PMOS transistor 826, a second small capacitor 828, and a second large capacitor 830. The first and the second pumping units alternately perform charge sharing which indicates that either pair of the clock pulses Fa and φb or φc and φd remains unchanged while the other pair of the clock pulses revert from high to low and vice versa within a time span of half a period. The pair of clock pulses φa and φb is used to control the first pumping unit 802 and the pair of clock pulses φc and φd is used to control the second pumping unit 804. During intervals 1–3, the first pumping unit 802 performs charge sharing while the second pumping unit performs pre-charge and during intervals 4–6, the second pumping unit 804 performs charge sharing while the first pumping unit performs pre-charge.

Figure 8:
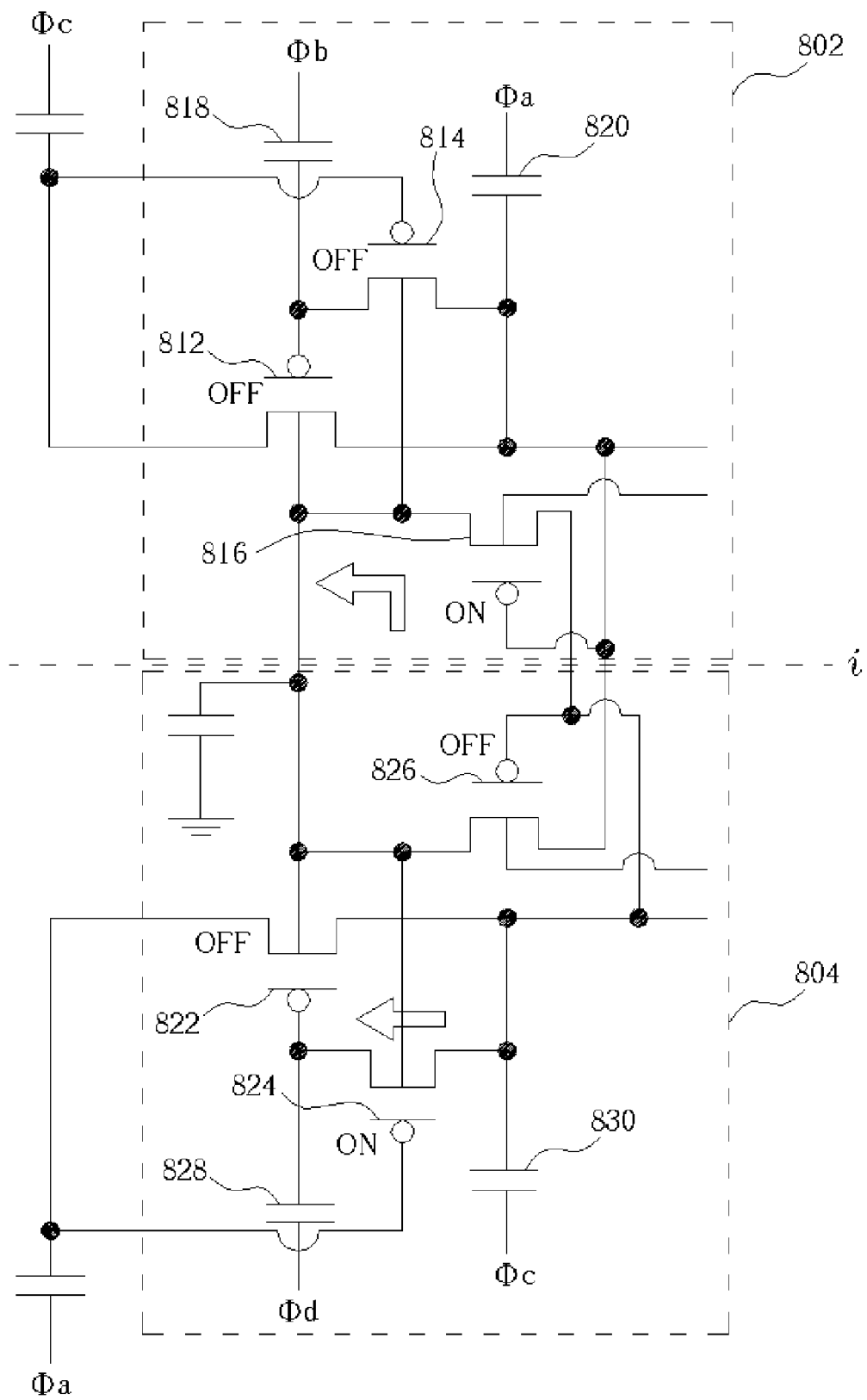
FIGS. 8–13 are diagrams showing the different stages of the positive dual pumping circuit of the present invention according to the intervals of the clock pulses in FIG. 7.

FIG. 8 shows the operation of the stage 530 of the dual pumping circuit 500 in FIG. 5 in interval 1 in FIG. 7 when the clock pulse φa goes from high to low, the clock pulse φb is high, the clock pulse of φc goes from low to high, and the clock pulse φd is high. As mentioned above that the first and the second pumping unit take turns to perform charge sharing and pre-charge, in intervals 1–3 only the first pumping unit 802 performs a charge sharing and the second pumping unit 804 remains in the pre-charge state. This preferred order in this embodiment is a design choice by the inventor and does not impose any restriction on the dual pumping circuit where the second pumping unit 802 can perform charge sharing first.

In interval 1, in the first pumping unit, the clock pulse φb is at high so the gate of the first main pass transistor 812 is raised and is off but the clock pulse φa goes from high to low so the first large capacitor is not charged. The first substrate transistor 816 is turned on so the high voltage from the source of the second boosting transistor 824 in the second pumping unit 804 is transferred to the body of the first and second main pass transistors 812 and 822. At this instant, the source of the first main pass transistor 812 is high but the drain of the first main pass transistor 814 is low because the gate of the first main pass transistor 812 is raised. The first main pass transistor 814 is in an off state ready for charge sharing in the subsequent interval 2.

While the first pumping unit 802 is getting ready to perform charge sharing, the second pumping unit 804 performs pre-charge. In the second pumping unit 804, the clock pulse φc goes from low to high and clock pulse φd is at high and the second small capacitor 828 is charged and the large capacitor 830 is not charged. The second boosting transistor 824 is turned on from receiving the clock pulse φa that is at low to allow the source and drain of the second boosting transistor 824 to be in conduct to send the high voltage to the gate of the second main pass transistor 822. At the same time, the clock pulse φc that is at high raises the gate of the second substrate transistor 826 so it is off. The high voltage from the clock pulse φd at high renders the second main pass transistor 822 off so the second pumping unit 804 remains in precharge state.

Figure 9:
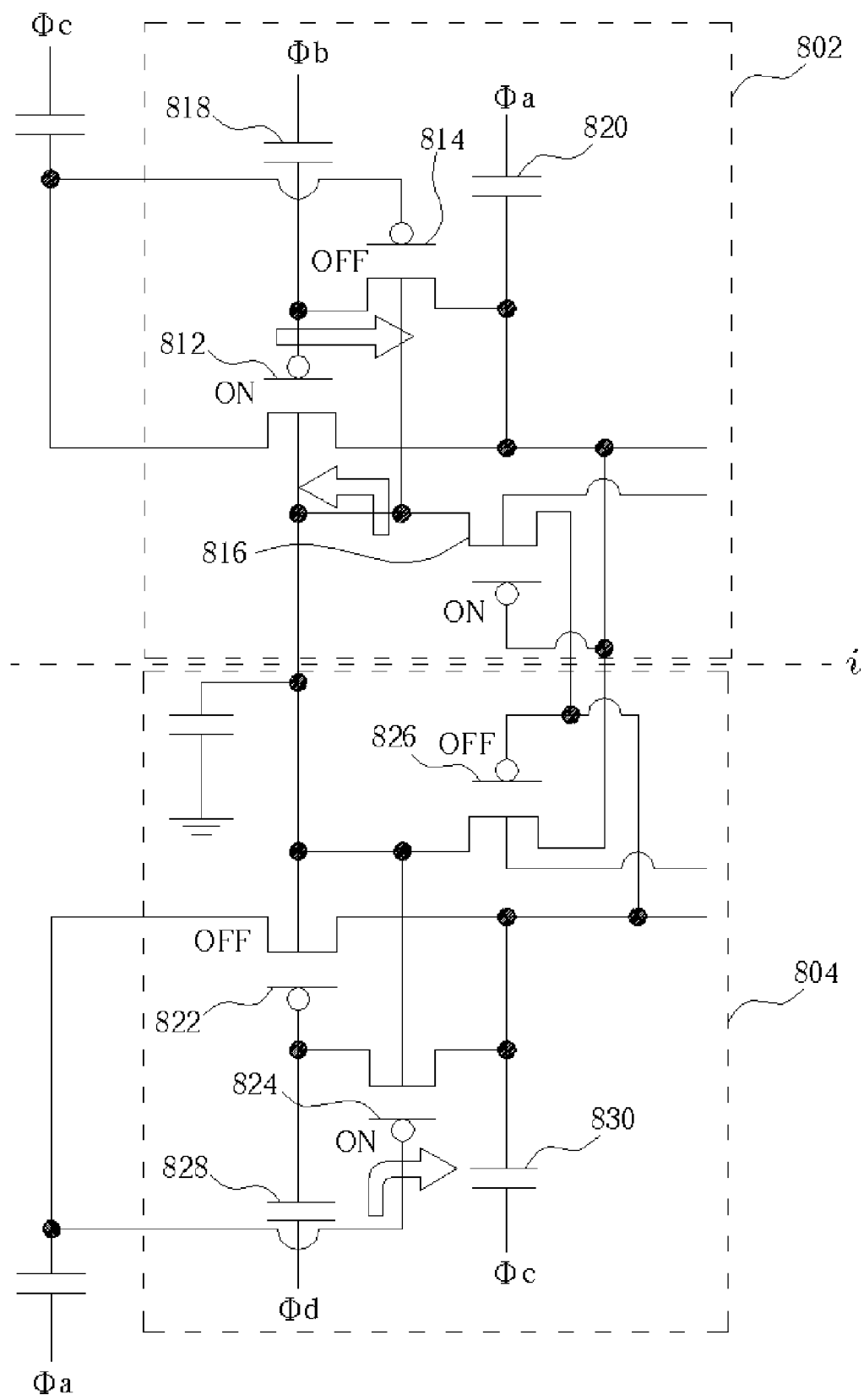

Please proceed to FIG. 9 which shows the operation of the stage 530 of the dual pumping circuit 500 in FIG. 5 in interval 2 in FIG. 7 when the clock pulse φa is low, the clock pulse φb goes from high to low, the clock pulse of φc is high, and the clock pulse φd is high. Since there is no change in the clock pulses φc and φd during intervals 1–3, the second pumping unit 804 maintains in precharge state and will be not be further discussed until it changes to perform charge sharing in intervals 4–6.

In this embodiment for a positive dual pumping circuit, the body of the transistors performing charge sharing is pumped to the highest voltage. In interval 2, in the first pumping unit 802, the body potentials of all the first main pass transistor 812, the first boosting transistor 814, and the first substrate transistor 816 are high when the gate of the first main pass transistor 812 receives the clock pulse φb that is at low. At this instant, the voltage from the preceding stage along with the clock pulse φc is transferred to the current stage. The first main pass transistor 812 experiences small influence of threshold voltage Vt drop because the gate voltage of the first main pass transistor 812 is much lower than its drain and source voltages. In the mean time, the voltage difference between the body, source, and drain is close to zero during the charge transfer which minimizes body effects and maximizes the gain from each stage of the dual pumping circuit of the present invention because the voltage level of the body of the transistors in the first pumping unit 802 is at the highest.

Figure 10:
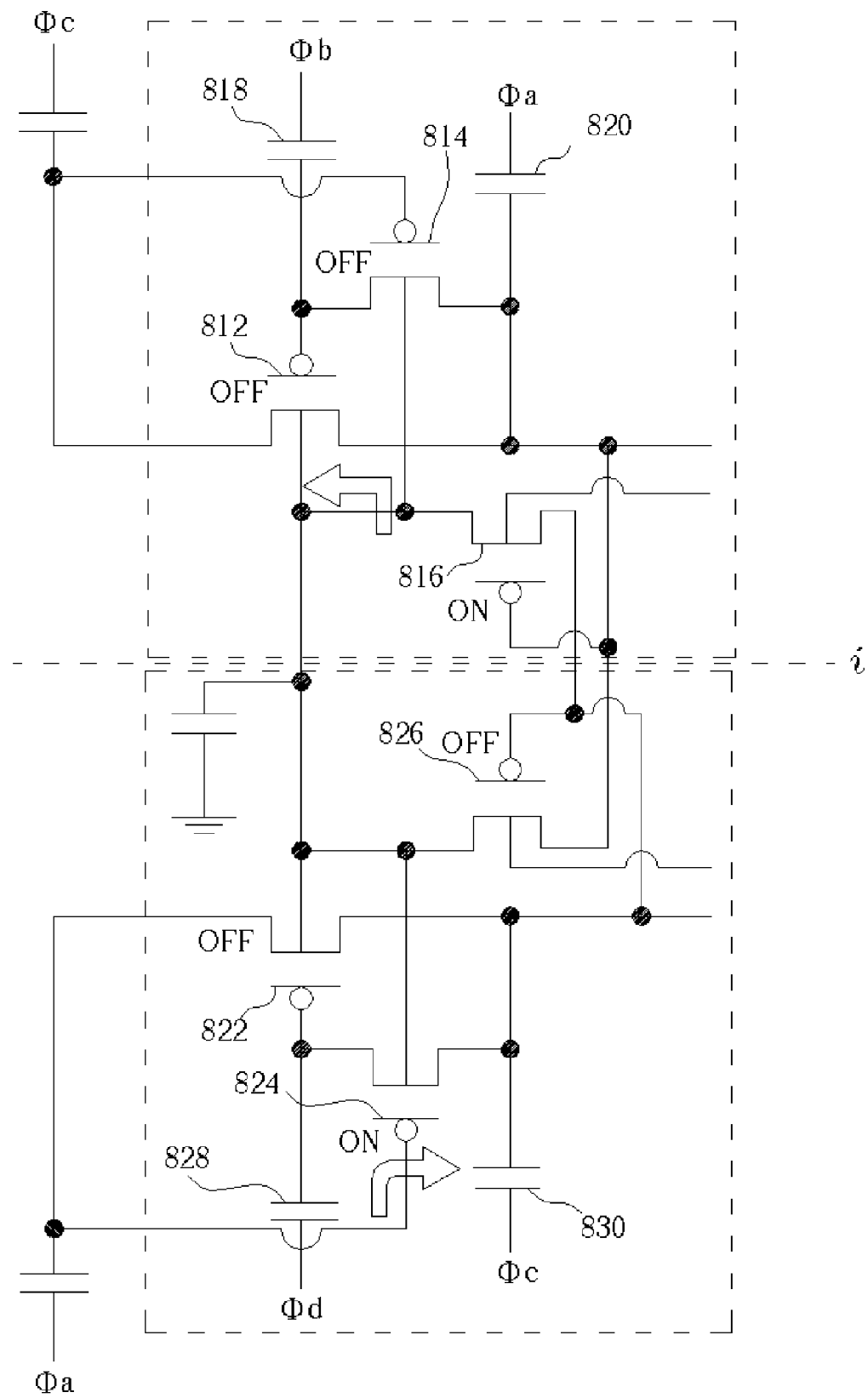

Please proceed to FIG. 10 which shows the operation of the stage 530 of the dual pumping circuit 500 in FIG. 5 in interval 3 in FIG. 7 when the clock pulse φa is low, the clock pulse φb goes from low to high, and the clock pulse of φc and φd are high. In interval 3, the state of the transistors in the first pumping unit 802 is identical to that in interval 1. Quickly after the charge sharing, the clock pulse φb rises back to high to raise the gate of the first main pass transistor 812. The first main pass transistor 812 is off. As a result, the charge at the drain and the gate are equalized for reducing threshold voltage Vt drop and body effects.

Figure 11:
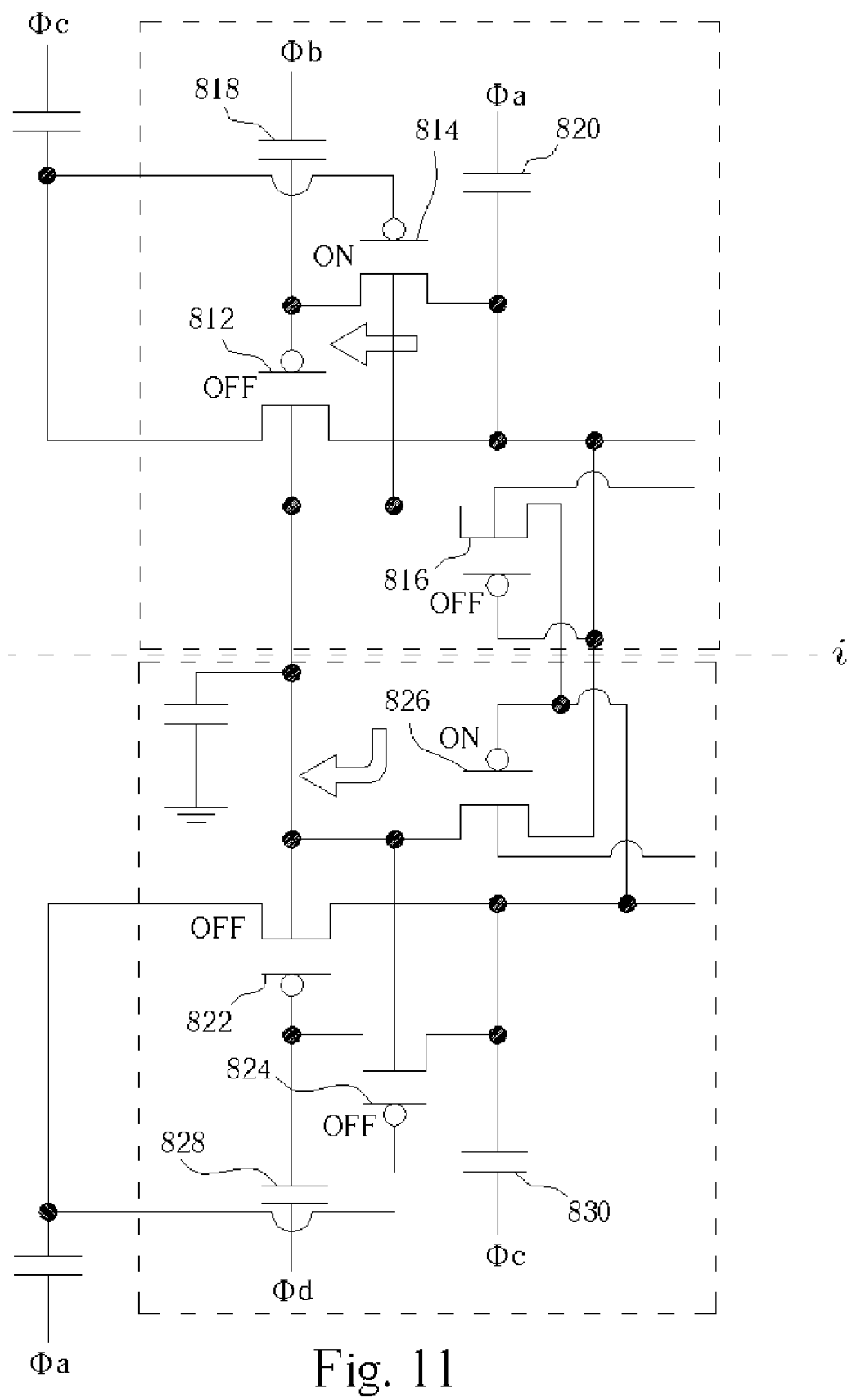

Please proceed to FIG. 11 which shows the operation of the stage 530 of the dual pumping circuit 500 in FIG. 5 in interval 4 in FIG. 7 when the clock pulse φa goes from low to high, the clock pulse φb is at high, the clock pulse φc goes from high to low, and the clock pulse φd is at high. The operation of the stage 530 of the dual pumping circuit 500 in intervals 4–6 is a reverse operation of that in intervals 1–2 where the first pumping unit 802 is in precharge state and the second pumping unit 804 performs charge sharing. Since the clock pulse φa and φc are exactly out of phase and one of each is used to control the first pumping unit 802 and the second pumping unit 804, the operation of the first pumping unit 802 and the second pumping unit 804 is exactly opposite. Furthermore due to the mirror structure of the dual pumping circuit, the first pumping unit 802 is structurally identical to the second pumping unit 804 and therefore the operation of the first pumping unit 802 and the second pumping unit 804 is also a flip along the imaginary line i.

Figure 12:
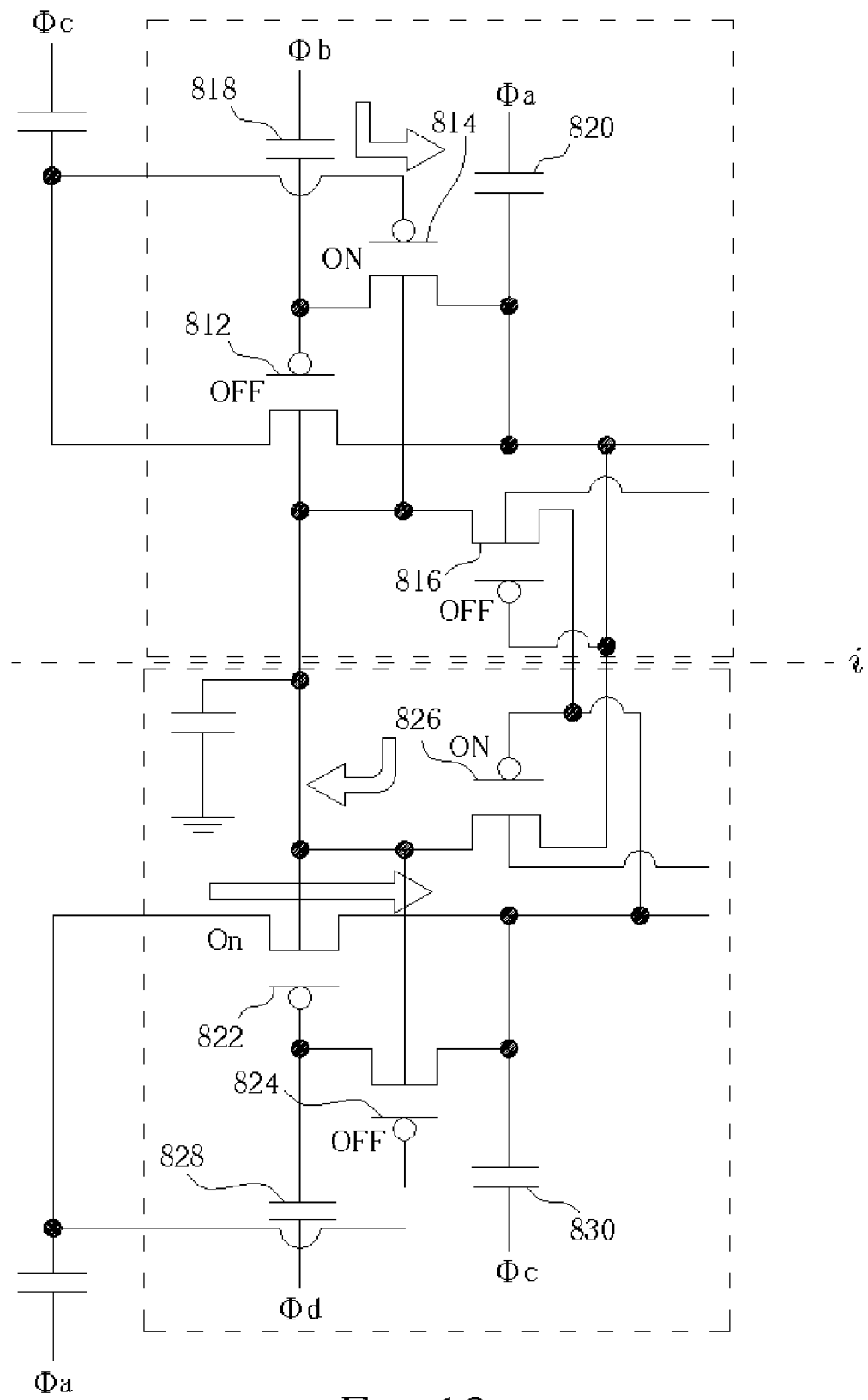

Please proceed to FIG. 12 which shows the operation of the stage 530 of the dual pumping circuit 500 in FIG. 5 in interval 5 in FIG. 7 when the clock pulse φa is high, the clock pulse φb is high, the clock pulse φc is low, and the clock pulse φd goes from high to low. Similar to interval 2, the second pumping unit 804 performs a charge sharing while the body of the transistors in the second pumping circuit 804 are pumped to the highest level to prevent any body effects.

Figure 13:
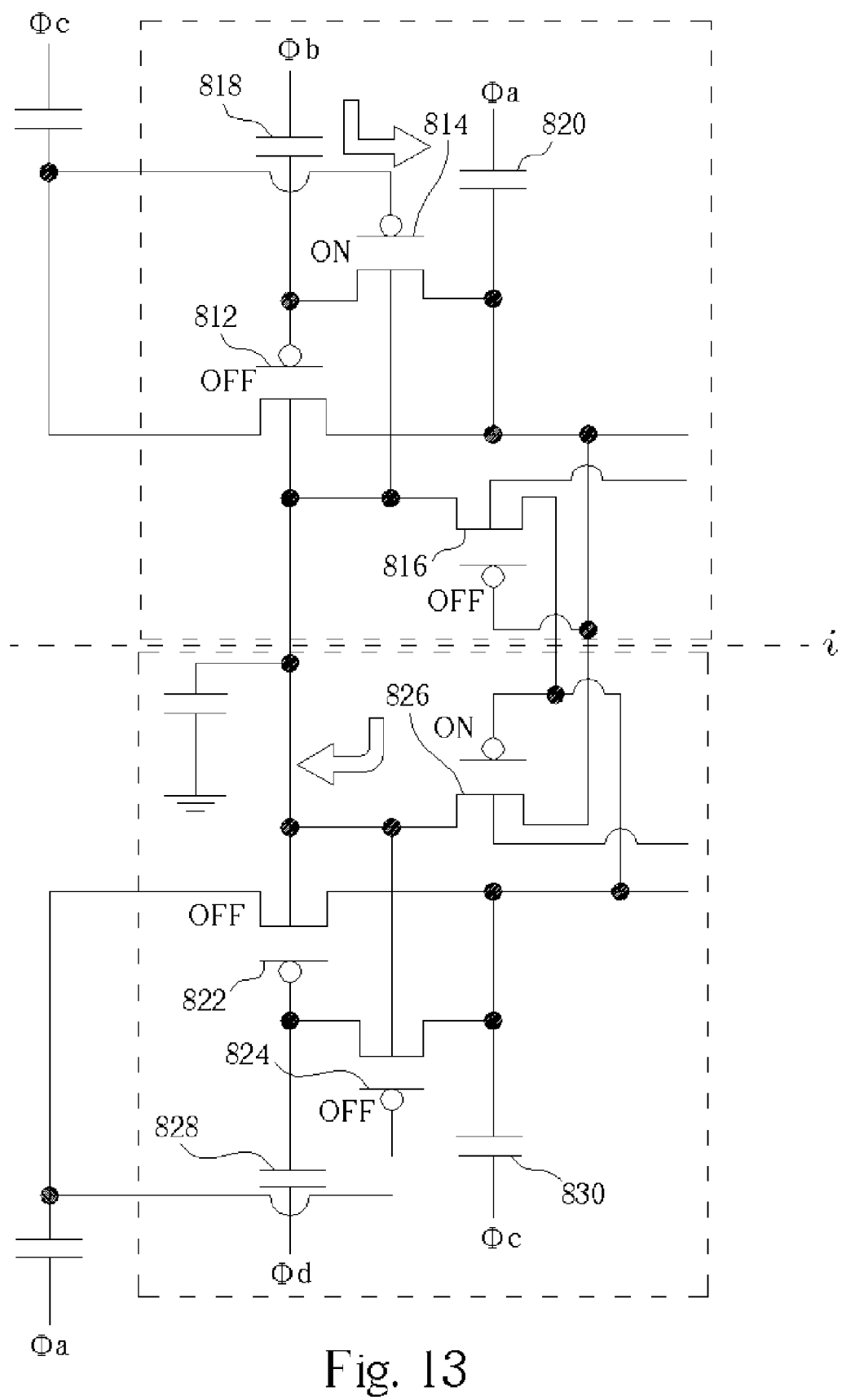

Please proceed to FIG. 13 which shows the operation of the stage 530 of the dual pumping circuit 500 in FIG. 5 in interval 6 in FIG. 7 when the clock pulse φa is high, the clock pulse φb is high, the clock pulse φc is low, and the clock pulse φd goes from low to high. Charge sharing by the second pumping circuit is completed and the pumped voltage is sent to the subsequent stage for further pumping.

Please refer to FIG. 14 which shows the HVC used for generating high voltage clock pulses from a low input voltage. The input voltage Vin is inputted to a first inverter 1402 and then to a second inverter 1404 where the voltage signal is transferred to both a first capacitor 1406 to a third inverter 1408 that is further electrically coupled to a second capacitor 1416. The first capacitor 1406 is electrically coupled to the source of the first NMOS transistor 1410 and the gate of the transistor 1412 and the second capacitor 1416 is electrically coupled to the source of the second NMOS transistor 1412 and the gate of the first NMOS transistor 1410. As a result, the two NMOS transistors 1410 and 1412 are cross-coupled to increase the amplitude of the input voltage Vin. To substantially reduce body effects, the body of the third PMOS transistor 1414 is electrically coupled to the drain of a fifth NMOS transistor 1424 whose source is electrically coupled to Vdd and gate is controlled by clock pulse φe which also at the same time control the third capacitor 1420 through a inverter 1422. The high voltage clock pulses φb and φd can be achieved by such cross-coupling scheme to increase the pumping gain at low supply voltage and to reduce power consumption and chip area.

Figure 15:
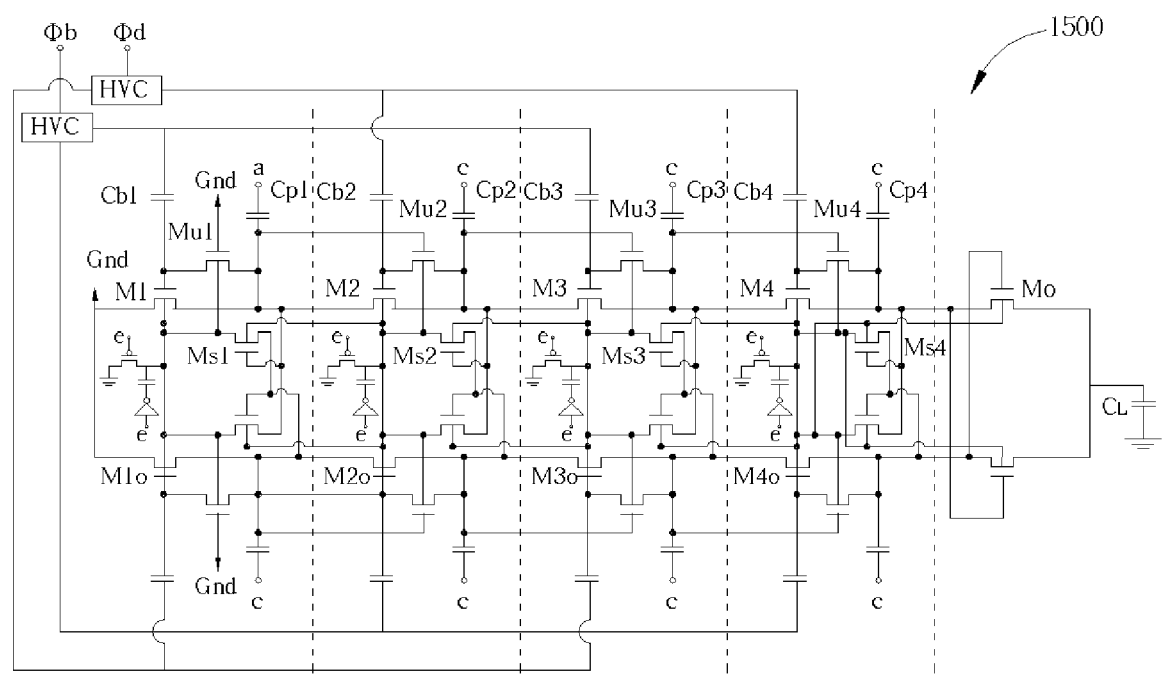
FIG. 15 is a schematic circuit layout for the negative dual pumping circuit according to one embodiment of the present invention.

Please refer to FIG. 15 which shows the negative dual pumping circuit 1500 according to another embodiment of the present invention. The negative dual pumping circuit 1500 is identical to that in FIG. 5 except for the choice of transistors. The PMOS transistors in the positive dual pumping circuit 500 are replaced by NMOS transistors in the negative dual pumping circuit 1500, and vice versa. The operation and structure of the negative dual pumping circuit 1500 is identical to that of the positive dual pumping circuit 500 so it is therefore purposely omitted. With the popular triple-well CMOS technology, the present invention can achieve both positive pumping for the use of PMOSFETS and NMOSFETS for negative pumping which provides flexibility in design when both positive and negative pumping are required.

Figure 16:
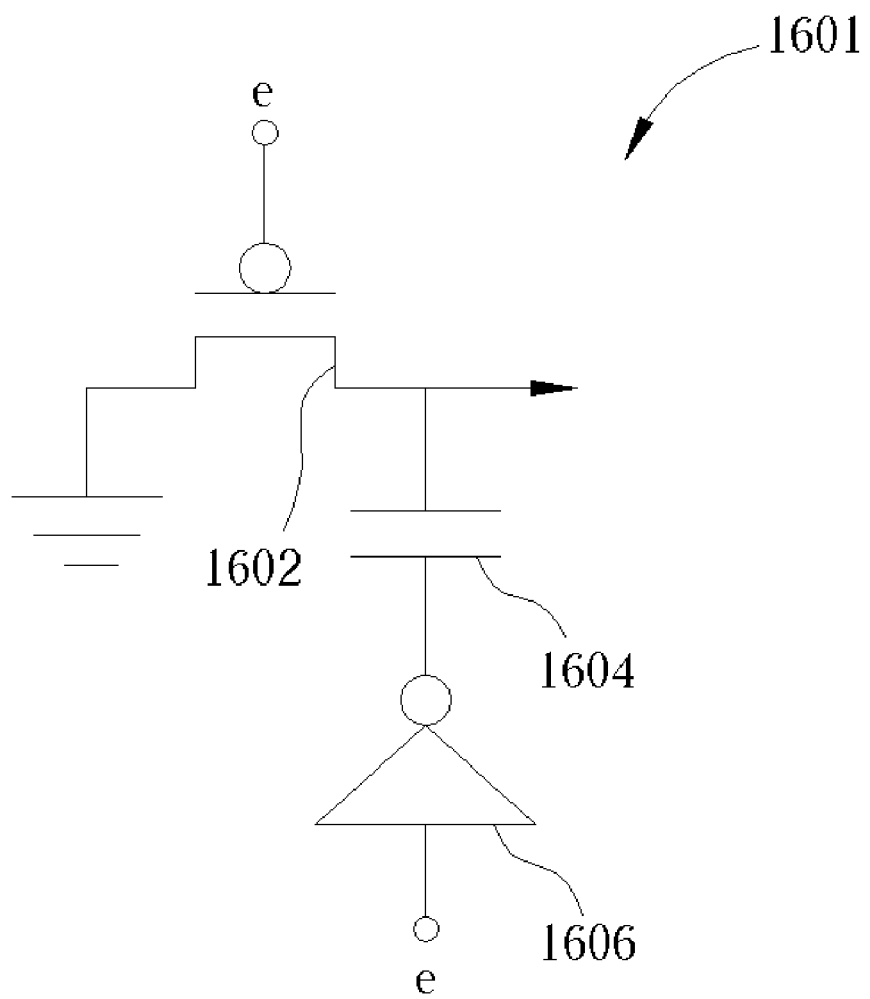
FIG. 16 is a magnified view of the schematic circuit layout for the negative dual pumping circuit according to one embodiment of the present invention.

Please continue to refer to FIG. 16 which shows another embodiment of the present invention with the addition of an extra voltage controller 1601 comprising a PMOS transistor 1602 and a capacitor 1604 and an inverter 1606. The operation and structure of the negative dual pumping circuit 1500 is identical to that of the positive dual pumping circuit 500 so it is therefore purposely omitted.

Figure 17:
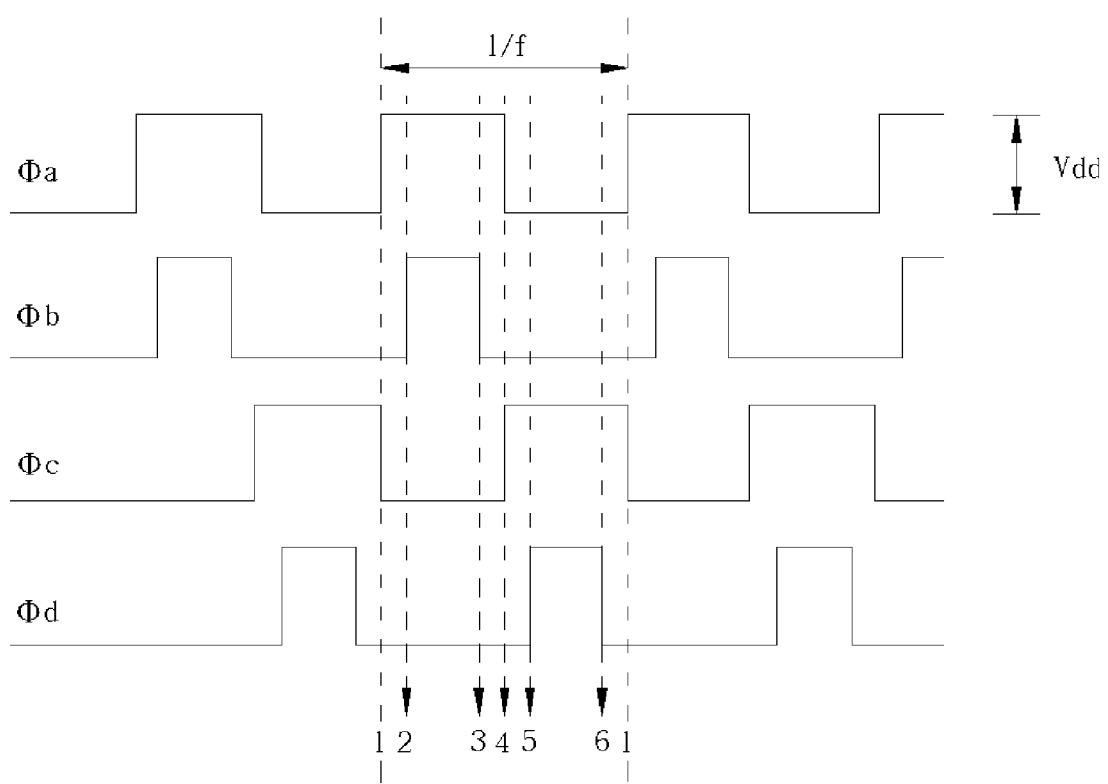
FIG. 17 is a diagram showing the clock pulses for controlling the operation of the negative dual pumping circuit in FIG. 15.

Please refer to FIG. 17 which shows the sets of clock pulses φa, φb, φc, andφd used to control the NMOS transistors of each stage of the dual pumping circuit in FIG. 15 of the present invention. It can be clearly identified from the diagram that the clock pulses Fa and φc are out-of-phase clock pulses and clock pulsesφb and φd follow clock pulses Fa and φc respectively by a narrower high voltage period. The identical but out-of-phase clock pulses only require a clock generator (not shown) which reduces the cost and difficulty of design. Clock pulse φb follows clock pulse φa and clock pulse φd follows clock pulse φc. The detailed cumulative operation of all the clock pulses Fa, φb, φc, andφd was explained previously referencing the positive circuit of FIG. 5 (see FIGS. 8–13), the negative circuit having analogous operation.

Figure 18:
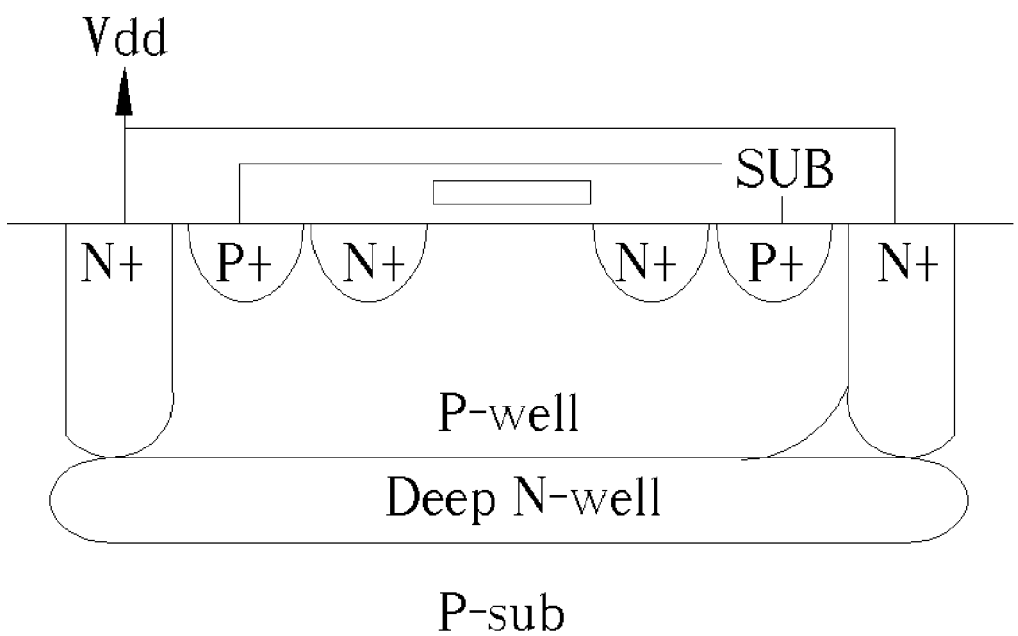
FIG. 18 is a schematic diagram showing the structure of a NMOS transistor used for the negative dual pumping circuit in FIG. 15.
Figure 19:
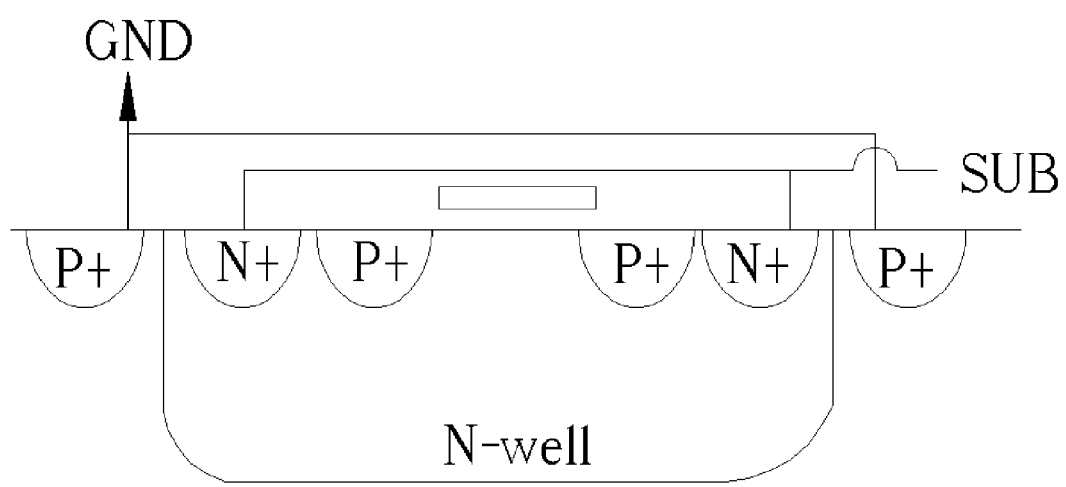
FIG. 19 is a schematic diagram showing the structure of a PMOS transistor used for the positive dual pumping circuit in FIG. 5.

Please refer to FIGS. 18 and 19 which show the triple-well structure which is suitable for both NMOS and PMOS transistors in the dual pumping circuit of the present invention. The triple-well structure MOSFET with p-substrate technology is well known for those skilled in the art and will not be described in the details. FIG. 18 shows a NMOS transistor that is used in the negative dual pumping circuit in FIG. 15 and FIG. 19 shows a PMOS transistor that is used in the positive dual pumping circuit in FIG. 5. The NMOS transistor in FIG. 18 has a bias voltage of the n-well to the supply voltage Vdd. In FIG. 19, the voltage difference between the n-well and the source and drain of the PMOS transistor is close to zero so the threshold voltage is minimized having a Vtp of –0.89V and body effect is eliminated.

Figure 20:
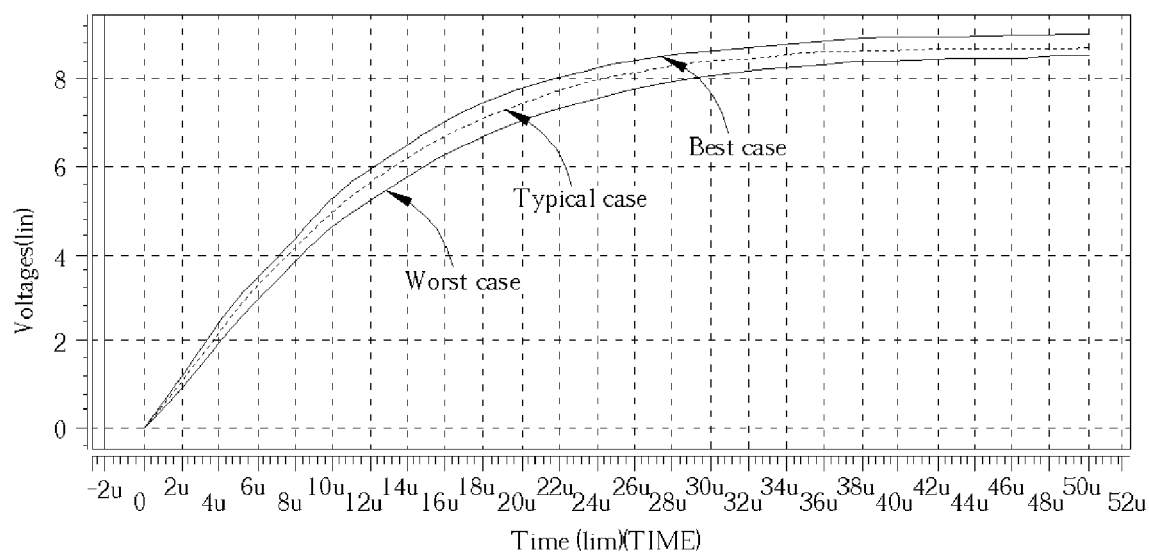
FIG. 20 is a graph showing the simulated results of the positive dual pumping circuit of the present invention.

Please refer to FIG. 20 which shows the simulated result of the positive dual pumping circuit of the present invention having 4 stages using a supply voltage of 1.65V with a loading of 500 pF. The graph shows three cases which are the best case, typical case, and worst case.

Figure 21:
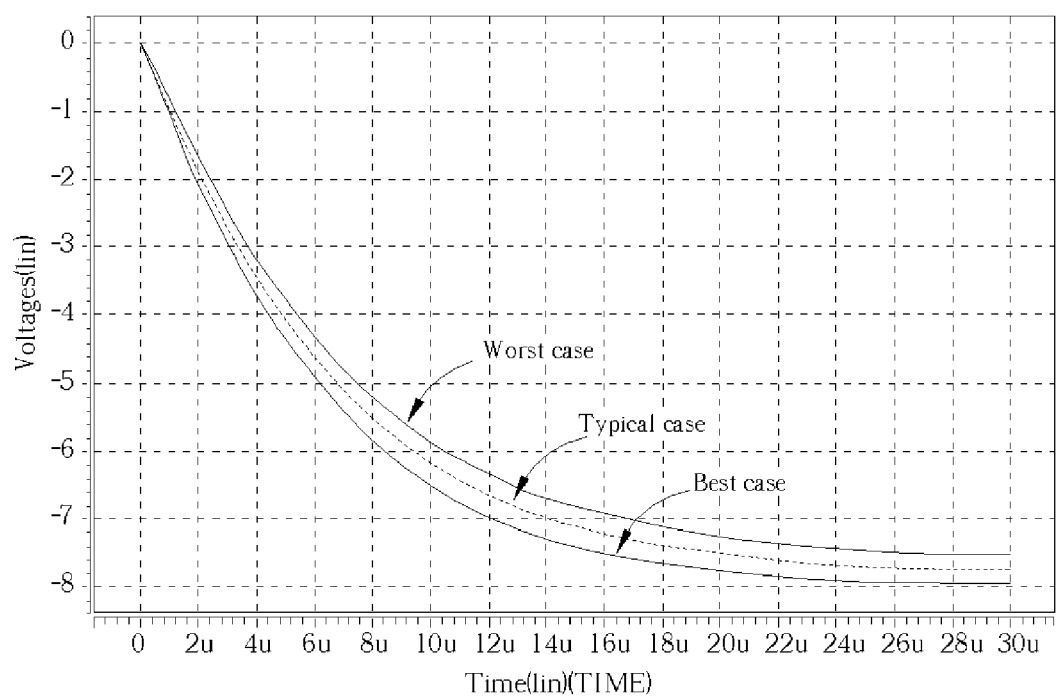
FIG. 21 is a graph showing the simulated results of the negative dual pumping circuit of the present invention.

Please refer to FIG. 21 which shows the simulated result of the negative dual pumping circuit of the present invention having 4 stages using an input voltage of 1.65V with a loading of 500 pF. The graph shows three cases which are the best case, typical case, and worst case.

In contrast to the prior art, the present invention provides a dual pumping circuit that can be implemented in either positive or negative with provides good pumping performance at low supply voltage (1V to 2V) using the popular triple-well technology. The dual pumping circuit uses four-phase clocks that has one pair of identical but out of phase clocks. The other two of the clocks may be chosen to be generated by a high voltage circuit to provide better pumping at low voltage. The positive dual pumping circuit uses PMOS transistors and the negative pumping circuit uses NMOS transistors where the transistors have special substrate connection to avoid body effect and p-n junction conduction.

Those skilled in the art will readily observe that numerous modifications and alterations of the device may be made while retaining the teachings of the invention. Accordingly, that above disclosure should be construed as limited only by the metes and bounds of the appended

What is claimed is:

1. A method for operating a dual pumping circuit comprising at least one stage, each stage comprising a first pumping unit and a second pumping unit mirrored to the first pumping unit to provide a common output, the first pumping unit comprising:

a main pass transistor with gate, source, and drain terminals and a body, each main pass transistor of each stage being connected in series with main pass transistors of a preceding and a subsequent stage, and the body of the main pass transistor being electrically coupled to a main pass transistor of the second pumping unit;

a boosting transistor with gate, source, and drain terminals and a body, the drain terminal of the boosting transistor being electrically coupled to the gate terminal of the main pass transistor, the source of the boosting transistor being electrically coupled to the drain of the main pass transistor, and the gate of the boosting transistor being electrically coupled to the source of the main pass transistor;

a substrate transistor with gate, source, and drain terminals and a body, the gate terminal of the substrate transistor being electrically coupled to the source terminal of the boosting transistor, the drain terminal of the main pass transistor, and the source of a substrate transistor of the second pumping unit, the drain terminal of the substrate transistor being electrically coupled to the body of each main pass transistor of the first and second pumping units and the boosting transistor, the source terminal of the substrate transistor being electrically coupled to a gate terminal of a substrate transistor and a drain terminal of a main pass transistor and a source terminal of a boosting transistor of the second pumping unit, and the body of the substrate transistor being electrically coupled to a main pass transistor in the subsequent stage;

two small charge storing devices respectively electrically coupled to the gate of the main pass transistor of the first pumping unit and the second pumping unit; and two large charge storing devices respectively electrically coupled to the drains of the main pass transistors of the first pumping unit and the second pumping unit;

the method comprising, for a first stage:

supplying an input voltage to the source terminals of the main pass transistors of the first pumping unit and the second pumping unit;

in interval one, rendering the main pass transistor of the second pumping unit, the substrate transistor of the second pumping unit, and the boosting transistors of the first pumping unit and the main pass transistor of the first pumping unit off, and the substrate transistor of the first pumping unit and the boosting transistor of the second pumping unit on;

in interval two, rendering the main pass transistor of the first pumping unit, the substrate transistor of the first pumping unit, and the boosting transistor of the second pumping unit on, and the boosting transistor of the first pumping unit, the substrate transistor of the second pumping unit, and the main pass transistor of the second pumping unit off;

in interval three, rendering the main pass transistor of the first pumping unit, the boosting transistor of the first pumping unit, the substrate transistor of the second pumping unit, and the main pass transistor of the second pumping unit off, the boosting transistor of the second pumping unit, and the substrate transistor of the first pumping unit on;

in interval four, rendering the substrate transistor of first pumping unit, the main pass transistor of the first pumping unit, the main pass transistor of the second pumping unit, and the boosting transistor of the second pumping unit off, the boosting transistor of the first pumping unit and the substrate transistor of the second pumping unit on;

in interval five, rendering the main pass transistor of the second pumping unit, the substrate transistor of the second pumping unit, and the boosting transistor of the first pumping unit on, and the substrate transistor of the first pumping unit, the main pass transistor of the first pumping unit, and the boosting transistor of the second pumping unit off; and in interval six, rendering the main pass transistor of the second pumping unit, the substrate transistor of the first pumping unit, the main pass transistor of the first pumping unit, and the boosting transistor of the second pumping unit off, and the substrate transistor of the second pumping unit and the boosting transistor of the first pumping unit on.

2. The method in claim 1 further comprising, for each even stage of the dual pumping circuit;

in interval one, rendering the substrate transistor of the first pumping unit and the boosting transistor of the second pumping unit on, the main pass transistor of the first pumping unit, the boosting transistor of the first pumping unit, the substrate transistor of the second pumping unit, and the main pass transistor of the second pumping unit off;

in interval two, rendering the main pass transistor of the first pumping unit, the substrate transistor of the first pumping unit, and the boosting transistor of the second pumping unit on, and the boosting transistor of the first pumping unit, the substrate transistor of the second pumping unit, and the main pass transistor of the second pumping unit off;

in interval three, rendering the substrate transistor of the first pumping unit and the boosting transistor of the second pumping unit on, and the main pass transistor of the first pumping unit, the boosting transistor of the first pumping unit, the substrate transistor of the second pumping unit, and the main pass transistor of the second pumping unit off;

in interval four, rendering the substrate transistor of first pumping unit, the boosting transistor of the second pumping unit, the main pass transistor of the first pumping unit, and the main pass transistor of the second pumping unit off, the substrate transistor of the second pumping unit and the boosting transistor of the first pumping unit on;

in interval five, rendering the substrate transistor of first pumping unit, the boosting transistor of the second pumping unit, and the main pass transistor of the first pumping unit off, the substrate transistor of the second pumping unit, the boosting transistor of the first pumping unit, and the main pass transistor of the second pumping unit on; and in interval six, rendering the substrate transistor of first pumping unit, the boosting transistor of the second pumping unit, the main pass transistor of the first pumping unit, and the main pass transistor of the second pumping unit off, and the substrate transistor of the second pumping unit and the boosting transistor of the first pumping unit on.

3. The method in claim 2 further comprising, for each odd stage of the dual pumping circuit except the first stage;

in interval one, rendering the substrate transistor of first pumping unit, the boosting transistor of the second pumping unit, the main pass transistor of the first pumping unit, and the main pass transistor of the second pumping unit off, and the substrate transistor of the second pumping unit and the boosting transistor of the first pumping unit on;

in interval two, rendering the substrate transistor of first pumping unit, the boosting transistor of the second pumping unit, and the main pass transistor of the first pumping unit off, the substrate transistor of the second pumping unit, the boosting transistor of the first pumping unit, and the main pass transistor of the second pumping unit on;

in interval three, rendering the substrate transistor of first pumping unit, the boosting transistor of the second pumping unit, the main pass transistor of the first pumping unit, and the main pass transistor of the second pumping unit off, and the substrate transistor of the second pumping unit and the boosting transistor of the first pumping unit on;

in interval four, rendering the substrate transistor of the first pumping unit and the boosting transistor of the second pumping unit on, the main pass transistor of the first pumping unit, the boosting transistor of the first pumping unit, the substrate transistor of the second pumping unit, and the main pass transistor of the second pumping unit off;

in interval five, rendering the main pass transistor of the first pumping unit, the substrate transistor of the first pumping unit, and the boosting transistor of the second pumping unit on, the boosting transistor of the first pumping unit, the substrate transistor of the second pumping unit, and the main pass transistor of the second pumping unit off; and in interval six, rendering the substrate transistor of the first pumping unit and the boosting transistor of the second pumping unit on, and the main pass transistor of the first pumping unit, the boosting transistor of the first pumping unit, the substrate transistor of the second pumping unit, and the main pass transistor of the second pumping unit off.

4. The method in claim 1, wherein the intervals one, two, three, four, five, and six are consecutive and in sequence.

5. The method in claim 1, wherein the dual pumping circuit further comprises:

first and second output transistors each with source, drain, and gate terminals and a body, the first output transistor mirroring the second output transistor, the source terminal of the first output transistor being electrically coupled to the drain terminal of the main pass transistor of the first pumping unit in a last stage, the gate terminal of the first output transistor being electrically coupled to the drain terminal of the substrate transistor of the second pumping unit in the last stage, and the body of the first output transistor being electrically coupled to the drain terminal of the substrate transistor of the second pumping unit in the last stage; the method further comprising:

rendering the first output transistor on when the substrate transistor of the second pumping unit in the last stage is rendered on and rendering the second output transistor off when the substrate transistor of the first pumping unit of the last stage is rendered off.

6. The method in claim 1, wherein supplying a voltage to the sources of the main pass transistors of the first stage is controlled by an inverter.

7. The method in claim 1, wherein the body of the main pass transistor of the first pumping unit and the body of the main pass transistor of the second pumping unit in each stage of the dual pumping circuit are preset to an appropriate bias voltage before pumping.

8. The method in claim 7, wherein the additional input voltage is controlled by a transistor that is electrically coupled to a capacitor.

9. A dual pumping circuit comprising at least one stage, each stage comprising a first pumping unit and a second pumping unit which are mirrored to each other to provide a common output, and each first pumping unit comprising:

a main pass transistor with gate, source, and drain terminals and a body, each main pass transistor of each stage being connected in series with main pass transistors of a preceding and a subsequent stage, and the body of the main pass transistor being electrically coupled to a main pass transistor of the second pumping unit;

a boosting transistor with gate, source, and drain terminals and a body, the drain terminal of the boosting transistor being electrically coupled to the gate terminal of the main pass transistor, the source of the boosting transistor being electrically coupled to the drain of the main pass transistor, and the gate of the boosting transistor being electrically coupled to the source of the main pass transistor;

a substrate transistor with gate, source, and drain terminals and a body, the gate terminal of the substrate transistor being electrically coupled to the source terminal of the boosting transistor, the drain terminal of the main pass transistor, and the source of a substrate transistor of the second pumping unit, the drain terminal of the substrate transistor being electrically coupled to the body of each main pass transistor of the first and second pumping units and the boosting transistor, the source terminal of the substrate transistor being electrically coupled to a gate terminal of a substrate transistor and a drain terminal of a main pass transistor and a source terminal of a boosting transistor of the second pumping unit, and the body of the substrate transistor being electrically coupled to a main pass transistor in the subsequent stage;

two small charge storing devices respectively electrically coupled to the gate of the main pass transistor of the first pumping unit and the second pumping unit; and two large charge storing devices respectively electrically coupled to the drain of the main pass transistor of the first pumping unit and the second pumping unit.

10. The dual pumping circuit in claim 9 further comprising a diode that is electrically coupled to each of the small charge storing devices and the large charge storing devices.

11. The dual pumping circuit in claim 9 wherein the gate terminal of the boosting transistor of the first and the second pumping units in the first stage is electrically coupled to a supply voltage, and the gate terminals of the boosting transistors of the first and the second pumping units in a stage other than the first stage is electrically coupled to the source terminals of the boosting transistors of the first and the second pumping units in the previous stage, respectively.

12. The dual pumping circuit in claim 9 further comprising a high voltage circuit applying to the two small charge storing devices for increasing a voltage level of clock pulses.

13. The method in claim 9, wherein the dual pumping circuit further comprises:

first and second output transistors each with source, drain, and gate terminals and a body, the first output transistor mirroring the second output transistor, the source terminal of the first output transistor being electrically coupled to the drain terminal of the main pass transistor of the first pumping unit in a last stage and the gate terminal of the second output transistor, the gate terminal of the first output transistor being electrically coupled to the drain terminal of the main pass transistor of the second pumping unit in the last stage, and the body of the first output transistor being electrically coupled to the drain terminal of the substrate transistor of the second pumping unit in the last stage.

14. The dual pumping circuit in claim 9, wherein the main pass transistor, the boosting transistor, and the substrate transistor are NMOSFETs for negative pumping.

15. The dual pumping circuit in claim 9, wherein the main pass transistor, the boosting transistor, and the substrate transistor are PMOSFETs for positive pumping.

16. The dual pumping circuit in claim 9, wherein a first clock pulse is sent to the gate of the first substrate transistor of the first pumping unit, a second clock pulse is sent to the gate of the main pass transistor of the first pumping unit, a third clock pulse is sent to the gate of the substrate transistor of the second pumping unit, and a fourth clock pulse is sent to the gate of the main pass transistor of the second pumping unit where the first and third clock pulses are out of phase and the second clock pulse turns on the main pass transistor of the first pumping unit for a shorter time than the first clock pulse does; and the fourth clock pulse turns on the main pass transistor of the second pumping unit for a shorter time than the third clock pulse does.

* * * * *